United States Patent
Chung et al.

(10) Patent No.: US 9,139,104 B2
(45) Date of Patent: Sep. 22, 2015

(54) U-TYPE BATTERY PACK FOR ELECTRIC VEHICLE

(75) Inventors: Chae-Ho Chung, Daejeon (KR); Ye-Hoon Im, Daejeon (KR); Dal-Mo Kang, Daejeon (KR); Jong-Moon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 537 days.

(21) Appl. No.: 12/997,481

(22) PCT Filed: Jun. 11, 2009

(86) PCT No.: PCT/KR2009/003140
§ 371 (c)(1),
(2), (4) Date: Dec. 10, 2010

(87) PCT Pub. No.: WO2009/151287
PCT Pub. Date: Dec. 17, 2009

(65) Prior Publication Data
US 2011/0129716 A1 Jun. 2, 2011

(30) Foreign Application Priority Data
Jun. 11, 2008 (KR) ........................ 10-2008-0054827

(51) Int. Cl.
*H01M 10/625* (2014.01)
*H01M 10/647* (2014.01)
*H01M 10/617* (2014.01)
*H01M 10/6565* (2014.01)
*H01M 10/651* (2014.01)
(Continued)

(52) U.S. Cl.
CPC ......... *B60L 11/1879* (2013.01); *H01M 2/1077* (2013.01); *H01M 10/613* (2015.04); *H01M 10/617* (2015.04); *H01M 10/625* (2015.04); *H01M 10/647* (2015.04); *H01M 10/651* (2015.04); *H01M 10/6565* (2015.04); *H01M 10/6563* (2015.04); *H01M 10/6566* (2015.04); *H01M 2220/20* (2013.01); *Y02T 10/7005* (2013.01); *Y02T 10/705* (2013.01)

(58) Field of Classification Search
USPC ........................................................ 429/120
See application file for complete search history.

(56) References Cited

U.S. PATENT DOCUMENTS 6,111,387 A    8/2000  Kouzu et al.
7,560,190 B2   7/2009  Ahn et al.
(Continued)

FOREIGN PATENT DOCUMENTS

JP    2006-128123 A    5/2006
JP    2007-227030 A    9/2007
(Continued)

*Primary Examiner* — Gregg Cantelmo
(74) *Attorney, Agent, or Firm* — Birch, Stewart, Kolasch & Birch, LLP

(57) ABSTRACT

A battery pack for an electric vehicle has a cooling structure in which a coolant introduced through a first cooling channel cools cells and is then discharged through a second cooling channel. The cooling structure has a U-type structure in which the coolant is introduced and discharged in opposite directions. An entrance of the first cooling channel and an exit of the second cooling channel satisfy an equation in relation to an entrance flow rate and an exit flow rate. Since the temperature deviation among cells is set very small, the life of a battery pack may be elongated. Also, since a ratio of an exit area to an entrance area of a cooling channel may be quantitatively calculated according to an equation, it becomes very easy to design a battery pack.

4 Claims, 4 Drawing Sheets

(51) Int. Cl.
*H01M 10/613* (2014.01)
*H01M 10/6563* (2014.01)
*H01M 10/6566* (2014.01)
*H01M 2/10* (2006.01)
*B60L 11/18* (2006.01)

(56) References Cited

U.S. PATENT DOCUMENTS

2006/0091856 A1* 5/2006 Lee et al. .................. 320/116
2006/0093901 A1 5/2006 Lee et al.
2007/0046259 A1 3/2007 Shimizu
2007/0202792 A1 8/2007 Shimizu et al.
2009/0258282 A1* 10/2009 Harada et al. .................. 429/61

FOREIGN PATENT DOCUMENTS

| | | |
|---|---|---|
| JP | 2007-250515 A | 9/2007 |
| KR | 10-0360968 B1 | 1/2003 |
| KR | 10-2006-0037600 A | 5/2006 |
| KR | 10-0658715 B1 | 12/2006 |
| KR | 10-0853621 B1 | 8/2008 |

* cited by examiner

U-TYPE BATTERY PACK FOR ELECTRIC VEHICLE

TECHNICAL FIELD

The present invention relates to a battery pack for an electric vehicle, and more particularly to a U-type battery pack having a cooling channel in which a coolant is introduced and discharged in opposite directions.

BACKGROUND ART

An electric vehicle obtains its driving energy from electric energy, not by combustion of fossil fuels like existing vehicles. Such an electric vehicle has advantages of substantially no exhaust gas and very small noise, but the electric vehicle has not been put into practical use due to drawbacks such as heavy battery and long charging time. However, as serious pollution and exhaustion of fossil fuels become important issues, the development of electric vehicles is accelerated again. In particular, for putting electric vehicles into practical use, it is needed to make a battery pack serving as a power source into a lightweight and small design and also shorten its charging time, so the studies on such a battery pack are very actively made.

The battery includes a plurality of cells connected in series, and the cells generate heat when the battery pack is charged or discharged. If the heat generated from the cells are left as it is, the life of the cells is shortened. Thus, the battery pack is generally provided with a cooling channel for removing the heat generated from the cells.

The battery pack may be classified into Z-type battery packs and U-type battery packs depending on the shape of the cooling channel. In the Z-type battery pack, an air serving as a coolant is introduced into and discharged from the cooling channel in the same direction. Meanwhile, in the U-type battery pack, an air serving as a coolant is introduced into and discharged from the cooling channel in opposite directions. Hereinafter, a general U-type battery pack is explained with reference to FIGS. 1 and 2. FIG. 1 is a perspective view showing a general U-type battery pack, and FIG. 2 is a sectional view taken along the line A-A' of FIG. 1.

The U-type battery pack 10 includes a plurality of cells 20 arranged to be connected in series, and cooling channels 30, 40 coupled to the cells 20. The cooling channels 30, 40 include a first cooling channel 30 coupled to an upper end of the cell 20 and a second cooling channel 40 coupled to a lower end of the cell 20.

One side 32 of the first cooling channel 30 is opened such that a coolant may be introduced therethrough. Also, in a portion of the lower surface of the first cooling channel 30, not coupled with the cells 20, a plurality of slits 34 are formed such that the introduced coolant may be discharged toward the cells 20.

In a portion of the upper surface of the second cooling channel 40, not coupled with the cells 20, a plurality of slits 44 are formed such that the coolant discharged from the first cooling channel 30 may be introduced. Also, one side 42 of the second cooling channel 40 is opened such that the coolant introduced through the slits 44 may be discharged out.

The coolant introduced through the side 32 subsequently passes through the slits 34, spaces between the cells 20, and the slits 44, and is then discharged out through the side 42. In this procedure, the coolant absorbs heat from the cells 20, thereby cooling the cells 20.

However, in the general U-type battery pack 10 configured as above, temperature deviation of the cells 20 is great, so lives of the cells 20 are seriously different from each other. Also, if some of the cells included in the battery pack run out, the entire battery pack should be exchanged, so living cells cannot be used any more due to the run-out cells. Thus, for solving the above problem, it is needed to study how to decrease temperature deviation of the cells 20.

DISCLOSURE

Technical Problem

The present invention is designed to solve the problems of the prior art, and therefore it is an object of the present invention to provide a U-type battery pack for an electric vehicle, which may keep temperature distribution of cells in a more uniform way.

Technical Solution

In order to accomplish the above object, the present invention provides a battery pack for an electric vehicle, which has a cooling structure in which a coolant introduced through a first cooling channel cools cells and is then discharged through a second cooling channel, wherein the cooling structure has a U-type structure in which the coolant is introduced and discharged in opposite directions, and wherein an entrance of the first cooling channel and an exit of the second cooling channel satisfy the following equation in relation to an entrance flow rate and an exit flow rate:

$$1.65 \times \left[ \frac{exit\_flow\_rate}{entrance\_flow\_rate} \right]^{1.5} = C \times \left[ \frac{exit\_area}{entrance\_area} \right]$$

where C ranges from 0.8 to 1.2.

Preferably, the cells are plate-type battery cells, and the cells are spaced apart from each other such that the coolant flows between the cells.

Preferably, the coolant is an air.

Preferably, a driving force for supplying the coolant to the cooling structure through the entrance is provided by a blowing fan installed at the entrance.

Preferably, the exit flow rate may be 50% to 99% of the entrance flow rate due to an outflow of the coolant.

In addition, the entrance and the exit of the battery pack according to the present invention preferably have a rectangular shape, and the entrance preferably has a width identical to that of the exit.

Also, the C preferably ranges from 0.85 to 1.15.

BEST MODE

Hereinafter, a U-type battery pack for an electric vehicle according to a preferred embodiment of the present invention will be described in detail with reference to the accompanying drawings.

Figure 1:
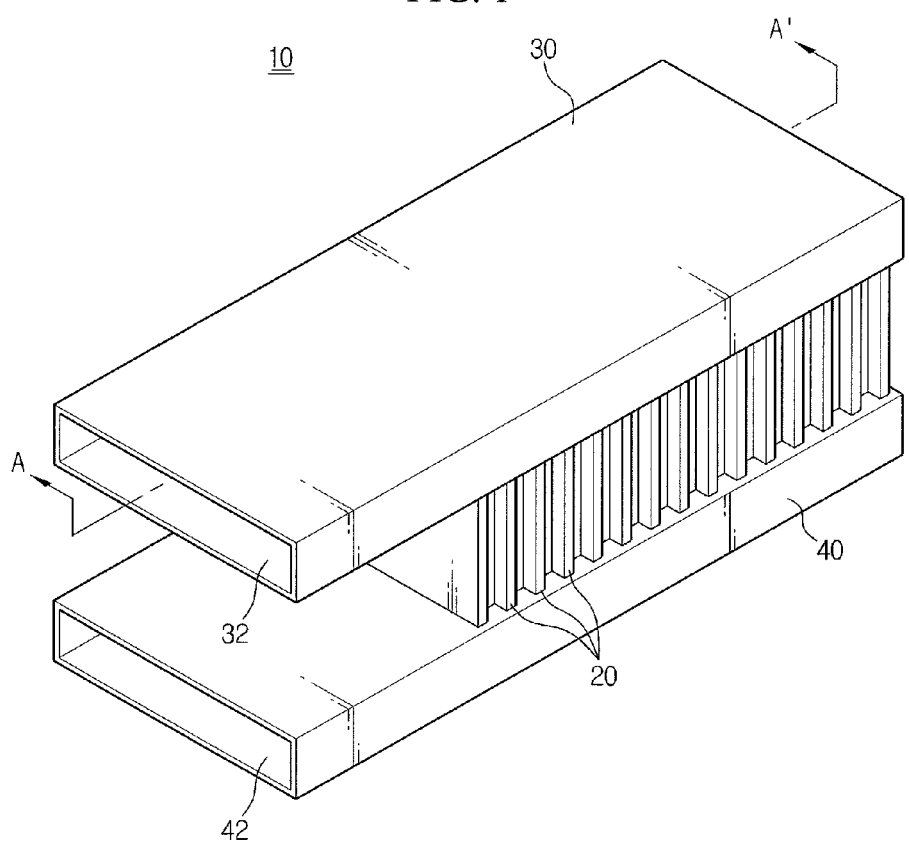
FIG. 1 is a perspective view showing a general U-type battery pack.
Figure 2:
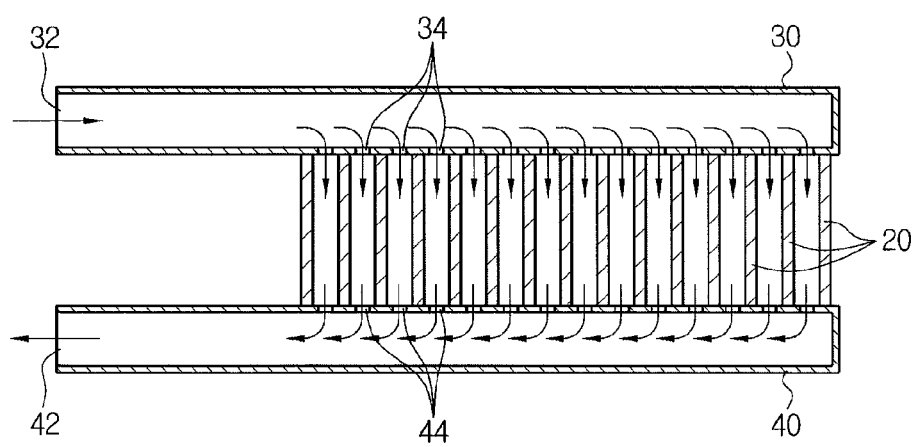
FIG. 2 is a sectional view taken along the line A-A' of FIG. 1.
Figure 3:
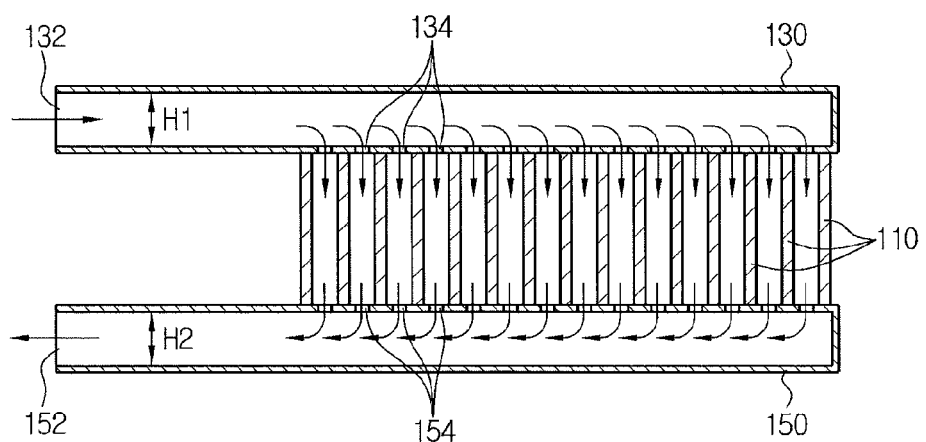
FIG. 3 is a sectional view sowing a U-type battery pack for an electric vehicle according to one embodiment of the present invention.

FIG. 3 is a sectional view showing a U-type battery pack for an electric vehicle according to one embodiment of the present invention.

The U-type battery pack 100 according to the present invention includes a plurality of cells 110, a first cooling channel 130 coupled to one ends of the cells 110, and a second cooling channel 150 coupled to the other ends of the cells 110.

The cell 110 is a plate-type battery cell. The plurality of cells 110 are arranged to be connected in series, and the cells 110 may be arranged in one or more rows. The voltage charged to the cells 110 are used for driving an electric vehicle, and the cells 110 are charged again after being discharged. As mentioned above, the cells 110 repeat charging and discharging, during which heat is generated from the cells 110. The heat is cooled by means of a coolant, for example air. The cells 110 are spaced apart from each other by a predetermined distance such that a coolant may flow between the cells 110.

One side of the first cooling channel 130 is an open surface 132 such that a coolant for cooling the cells 110 may be introduced from the outside. Also, in a portion of the lower surface of the first cooling channel 130, not coupled with the cells 110, a plurality of slits 134 are formed such that the introduced coolant may be discharged toward the cells 110. The coolant introduced through the open surface 132 flows into the spaces between the cells 110 through the plurality of slits 134, thereby cooling the cells 110.

In a portion of the upper surface of the second cooling channel 150, not coupled with the cells 110, a plurality of slits 154 are formed such that the coolant passing via the spaces between the cells 110 is introduced. Also, one side of the second cooling channel 150 is an open surface 152 such that the coolant introduced through the slits 154 may be discharged out. At this time, the coolant is discharged in a direction opposite to an introduction direction of the coolant into the first cooling channel 130.

The first and second cooling channels 130, 150 may have certain width and height along their length directions, and the width is substantially identical to a width of a space where the cells 110 are placed.

The temperature deviation of the cells 110 may be determined according to a ratio of a flow rate of coolant discharged from the second cooling channel 150 through the open surface 152 to a flow rate of coolant introduced to the first cooling channel 130 through the open surface 132, and a ratio of an exit area of the open surface 152 to an entrance area of the open surface 132. According to experiments executed by the inventors, it was revealed that the temperature deviation has no serious relation with the widths of the first and second cooling channels 130, 150.

Meanwhile, the entrance and the exit preferably have a rectangular shape, and the entrance preferably has a width identical to that of the exit. In this case, if the ratio of a flow rate of coolant discharged from the second cooling channel 150 through the open surface 152 to a flow rate of coolant introduced to the first cooling channel 130 through the open surface 132 is set, the temperature deviation of the cells 110 may be minimized by adjusting a ratio of a height H2 of the open surface 152 to a height H1 of the open surface 132.

If the ratio of an exit area of the open surface 152 to an entrance area of the open surface 132 satisfies the following equation 1, the temperature deviation of the cells 110 may be minimized. In the following equation 1, the flow rate at the exit means a flow rate of coolant discharged from the second cooling channel 150 through the open surface 152, and the flow rate at the entrance means a flow rate of coolant introduced to the first cooling channel 130 through the open surface 132.

It is preferred that the temperature deviation of the cells 110 is not greater than 5 degrees, more preferably not greater than 3 degrees. If the temperature deviation does not exceed 5 degrees, it may be considered that the function of the cells 110 is degraded relatively uniformly. However, if the temperature deviation exceeds 5 degrees, the deviation of function degradation of the cells 110 is increased as time goes, so the performance of the entire battery pack is leveled down. In addition, the temperature deviation may become worse according to environments or pattern of using the battery pack, so the possibility of some cells 110 to deviate from an operation temperature range is increased, which may cause problems in stability.

In the following equation 1, C is a constant ranging from 0.8 to 1.2, preferably ranging from 0.85 to 1.15. Also, in the following equation 1, a sectional area of the first cooing channel 130 is constant in its length direction, and a sectional area of the second cooling channel 150 is constant in its length direction.

$$1.65 \times \left[\frac{exit\_flow\_rate}{entrance\_flow\_rate}\right]^{1.5} = C \times \left[\frac{exit\_area}{entrance\_area}\right] \qquad \text{Equation 1}$$

If the entrance and the exit have the same width and the same rectangular shape, in other words, if the open surface 132 and the open surface 152 have the same width and the entrance and the exit are identically rectangular, the equation 1 may be changed as follows.

$$1.65 \times \left[\frac{exit\_flow\_rate}{entrance\_flow\_rate}\right]^{1.5} = C \times \left[\frac{exit\_height}{entrance\_height}\right]$$

In this equation, the exit height means a height H2 of the open surface 152, and the entrance height means a height H1 of the open surface 132.

Meanwhile, due to the outflow of coolant in the above cooling structure, a flow rate of coolant at the exit may be smaller than a flow rate of coolant at the entrance. In this case, the flow rate at the exit is preferably 50% to 99% of the flow rate at the entrance.

In addition, the coolant is introduced to the first cooling channel 130 by means of a blowing fan (not shown) installed at the entrance of the first cooling channel 130. The blowing fan gives a driving force for introducing the coolant into the first cooling channel 130.

Figure 4:
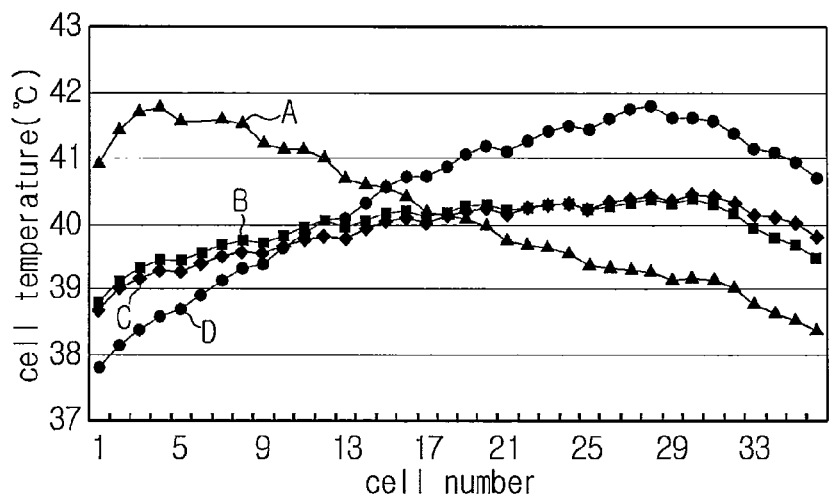
FIGS. 4 to 6 are simulation results illustrating temperature distribution of cells included in the battery pack.
Figure 5:
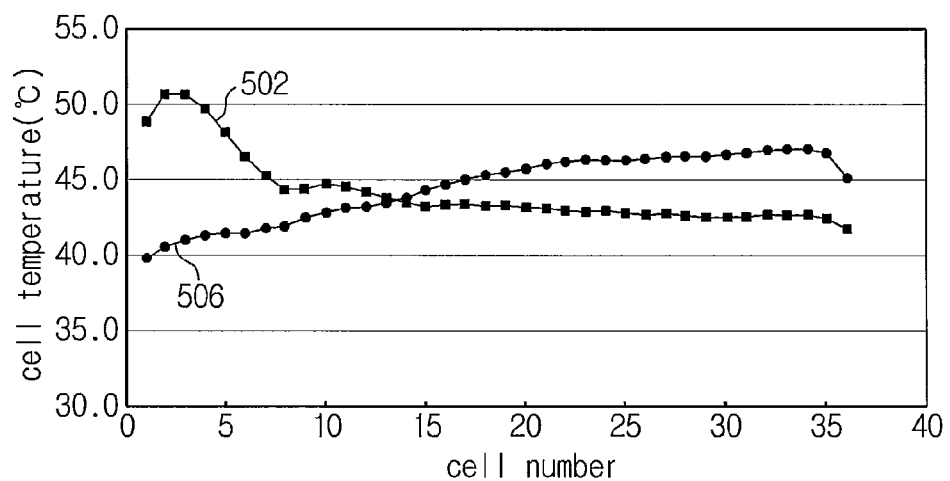
Figure 6:
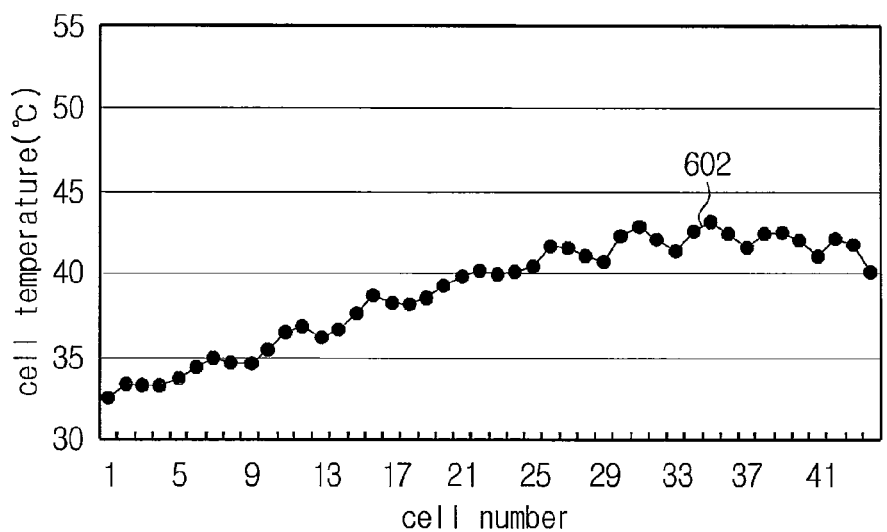

The inventors executed computer simulations for measuring temperature of the cells 110 included in the battery pack 100. The simulation results are shown in FIGS. 4 to 6. In FIGS. 4 to 6, a horizontal axis represents numbers of the cells 110, and a vertical axis represents an average temperature of each cell 110. The numbers of the cells 110 are set to increase rightward. The results shown in FIGS. 4 and 5 are derived by applying a load of 40A to the battery pack 100 including 36 cells 110 under an external temperature of 30° C., and the results shown in FIG. 6 are derived from the battery pack 100 including 44 cells 110 under the same conditions.

In FIG. 4, the graph A is obtained in the case that a ratio of exit flow rate to entrance flow rate is 0.790, and a ratio of exit area to entrance area is 1.43. In this case, C value drawn from the equation 1 is 0.81, which is within the range from 0.8 to 1.2. Seeing the graph A, it would be found that a difference between a maximum temperature and a minimum temperature of the cells 110, namely a temperature deviation of the cells 110 is about 3.5, which is very small. The graph B is obtained in the case that a ratio of exit flow rate to entrance flow rate is 0.770, and a ratio of exit area to entrance area is 1.11. In this case, C value drawn from the equation 1 is 1.00, which is within the range from 0.8 to 1.2. Seeing the graph B, it would be found that a difference between a maximum temperature and a minimum temperature of the cells 110, namely a temperature deviation of the cells 110 is about 1.6, which is very small.

The graph C is obtained in the case that a ratio of exit flow rate to entrance flow rate is 0.798, and a ratio of exit area to entrance area is 1.09. In this case, C value drawn from the equation 1 is 1.8, which is within the range from 0.8 to 1.2. Seeing the graph C, it would be found that a difference between a maximum temperature and a minimum temperature of the cells 110, namely a temperature deviation of the cells 110 is about 1.8, which is very small.

The graph D is obtained in the case that a ratio of exit flow rate to entrance flow rate is 0.745, and a ratio of exit area to entrance area is 0.9. In this case, C value drawn from the equation 1 is 1.18, which is within the range from 0.8 to 1.2. Seeing the graph D, it would be found that a difference between a maximum temperature and a minimum temperature of the cells 110, namely a temperature deviation of the cells 110 is about 4, which is very small.

In FIG. 5, a graph 502 is obtained in the case that a ratio of exit flow rate to entrance flow rate is 0.7, and a ratio of exit area to entrance area is 1.25. In this case, C value drawn from the equation 1 is 0.78, which is not within the range from 0.8 to 1.2. Seeing the graph 502, it would be found that a temperature deviation of the cells 110 is about 10, which is very great.

In FIG. 5, a graph 506 is obtained in the case that a ratio of exit flow rate to entrance flow rate is 0.7, and a ratio of exit area to entrance area is 0.8. In this case, C value drawn from the equation 1 is 1.21, which is not within the range from 0.8 to 1.2. Seeing the graph 506, it would be found that a temperature deviation of the cells 110 is about 7, which is very great.

In FIG. 6, a graph 602 is obtained in the case that a ratio of exit flow rate to entrance flow rate is 0.765, and a ratio of exit area to entrance area is 0.875. In this case, C value drawn from the equation 1 is 1.27, which is not within the range from 0.8 to 1.2. Seeing the graph 602, it would be found that a temperature deviation of the cells 110 is about 10, which is very great.

Figure 7:
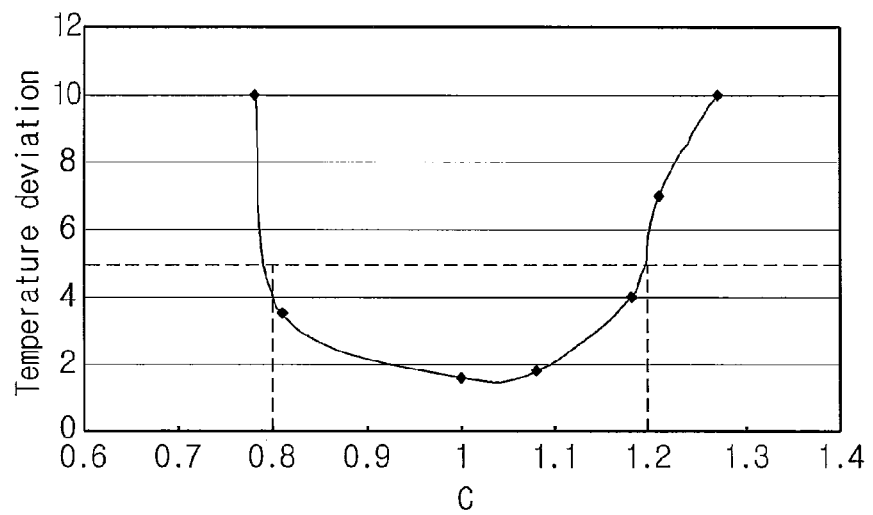
FIG. 7 is a graph showing temperature difference of the cells according to C values.

Meanwhile, FIG. 7 is a graph showing a temperature difference of the cells in each embodiment according to the C value. In case C is in the range from 0.8 to 1.2, the temperature difference of the cells is about 5 degrees or less, which is not so great. However, it could be understood that the temperature difference is rapidly increased if C is less than 0.8 or exceeds 1.2.

INDUSTRIAL APPLICABILITY

According to the present invention, the temperature deviation among cells is set very small, so the life of a battery pack may be elongated. Also, since a ratio of an exit area to an entrance area of a cooling channel may be quantitatively calculated according to an equation, it becomes very easy to design a battery pack.

What is claimed is:

1. A method of cooling a battery pack, comprising a U-type cooling structure in which a plurality of cells are arranged between a first cooling channel and a second cooling channel to be spaced apart from each other by a slit and a coolant introduced through the first cooling channel cools cells while passing through the slit and is then discharged through a second cooling channel in opposite direction to the coolant introduction direction and a blowing fan is installed at an entrance of the first cooling channel, the method comprising the step of:

determining an exit flow rate of the coolant discharged from the second cooling channel, an entrance flow rate of the coolant introduced to the first cooling channel and a ratio of the exit flow rate to the entrance flow rate;

arranging the first cooling channel and the second cooling channel such that the ratio of an exit area of the second cooling channel to an entrance area of the first cooling channel satisfies the following equation such that the temperature deviation of the cells is not greater than 5° C.:

$$1.65 \times \left[ \frac{\text{exit\_flow\_rate}}{\text{entrance\_flow\_rate}} \right]^{1.5} = C \times \left[ \frac{\text{exit\_area}}{\text{entrance\_area}} \right]$$

wherein C is in a range of 0.8 to 1.2; and introducing the coolant to the first cooling channel by means of the blowing fan, wherein the blowing fan gives a driving force for introducing the coolant into the first cooling channel.

2. The method recited in claim 1, wherein the ratio of the exit flow rate to the entrance flow rate is within a range of 0.745-0.798.

3. The method recited in claim 1, wherein a sectional area of the first cooing channel is constant in its length direction, and a sectional area of the second cooling channel is constant in its length direction.

4. The method recited in claim 1, wherein a width of the first cooling channel and the second cooling channel is substantially identical to a width of a space where the cells are placed.

* * * * *